United States Patent
Hranilovic et al.

(10) Patent No.: US 9,544,766 B2
(45) Date of Patent: Jan. 10, 2017

(54) SYSTEM AND METHOD FOR AUTHENTICATION AND KEY EXCHANGE FOR A MOBILE DEVICE VIA SPECTRALLY CONFINED WIRELESS COMMUNICATIONS

(75) Inventors: Steve Hranilovic, Oakville (CA); Christopher Labrador, Austin, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 38 days.

(21) Appl. No.: 14/114,802

(22) PCT Filed: May 31, 2011

(86) PCT No.: PCT/US2011/038586
§ 371 (c)(1),
(2), (4) Date: Oct. 30, 2013

(87) PCT Pub. No.: WO2012/166115
PCT Pub. Date: Dec. 6, 2012

(65) Prior Publication Data
US 2014/0072119 A1 Mar. 13, 2014

(51) Int. Cl.
H04K 1/00 (2006.01)
H04W 12/04 (2009.01)
H04L 9/32 (2006.01)

(52) U.S. Cl.
CPC .......... *H04W 12/04* (2013.01); *H04L 9/3215* (2013.01); *H04L 2209/80* (2013.01)

(58) Field of Classification Search
CPC .. H04L 9/3215; H04L 2209/80; H04L 9/3226; H04W 12/04

(Continued)

(56) References Cited

U.S. PATENT DOCUMENTS 5,864,625 A * 1/1999 Rutledge ............... H04L 9/0891
380/256
2006/0017566 A1 * 1/2006 Gauvreau .......... G08B 13/2491
340/541

(Continued)

FOREIGN PATENT DOCUMENTS

EP 2 715 969 A1 4/2014

OTHER PUBLICATIONS

EPO, Communication Pursuant to Rules 161(1) and 162 EPC, Application No. 11726010.9, Feb. 6, 2014, 2 pgs.

(Continued)

*Primary Examiner* — Michael S McNally
*Assistant Examiner* — Amie C Lin
(74) *Attorney, Agent, or Firm* — Fish & Richardson P.C.

(57) ABSTRACT

An architecture, system and associated method and apparatus for securely communicating authentication data to a communication device. In one embodiment, the method includes modulating a spectral source's radiation using the authentication data, wherein the spectral source's radiation is adapted to operate as a first transmission medium for carrying the authentication data, the first transmission medium being containable within an enclosure that inhibits passage of the spectral source's radiation (i.e., spectrally opaque enclosure). The modulated authentication data is transmitted via the first transmission medium to the communication device disposed in the spectrally opaque enclosure.

26 Claims, 5 Drawing Sheets

(58) Field of Classification Search
USPC .......................................................... 380/270
See application file for complete search history.

(56) References Cited

U.S. PATENT DOCUMENTS

| | | |
|---|---|---|
| 2009/0067846 A1* | 3/2009 | Yu et al. ........................ 398/128 |
| 2010/0246825 A1 | 9/2010 | Baras et al. |
| 2011/0026474 A1* | 2/2011 | Freda et al. ................... 370/329 |
| 2012/0118514 A1* | 5/2012 | Hughes ........................... 160/25 |

OTHER PUBLICATIONS

A Security Application of the Warwick Optical Antenna in Wireless Local and Personal Area Networks, undated, I. Pavlosoglou et al., 4 pgs.

PCT, Notification of Transmittal of the International Preliminary Report on Patentability, Application No. PCT/US2011/038586, Jul. 19, 2013, 14 pgs.

International Search Report and Written Opinion issued for corresponding PCT Application No. PCT/US2011/038586, mailed Feb. 3, 2012, 13 pages.

* cited by examiner

SYSTEM AND METHOD FOR AUTHENTICATION AND KEY EXCHANGE FOR A MOBILE DEVICE VIA SPECTRALLY CONFINED WIRELESS COMMUNICATIONS

CROSS-REFERENCE TO RELATED APPLICATION(S) & CLAIM OF PRIORITY

This application is a National Phase application of and claims the benefit under 35 U.S.C. §371 to International Application No. PCT/US2011/038586, filed May 31, 2011 having the title "SYSTEM AND METHOD FOR AUTHENTICATION AND KEY EXCHANGE FOR A MOBILE DEVICE VIA SPECTRALLY CONFINED WIRELESS COMMUNICATIONS", which is hereby incorporated by reference into the detailed description hereof.

FIELD OF THE DISCLOSURE

The present patent disclosure generally relates to mobile telecommunications networks. More particularly, and not by way of any limitation, the present patent disclosure is directed to a system and method for communicating or otherwise exchanging authentication and key data with a mobile communication device via spectrally confined wireless communication links.

BACKGROUND

Mobile radio device communication is typically effectuated on an open and shared channel and, accordingly, all transmissions to and from the device have the possibility of being monitored and modified. A principal difficulty with such radio channels is how to establish a secure communication environment between two devices. Two main processes are commonly involved: authentication and key exchange. Authentication establishes the identities of the communicating parties to permit trust that the data received is from the intended device (usually via a common shared secret). Key exchange involves the transmission of data between the communicating parties in order to establish secret keys for encryption. Given the open nature of broadcast radio transmissions, it should be appreciated that the transmission of secret keys on an open network is susceptible to eavesdropping and man-in-the-middle attacks.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
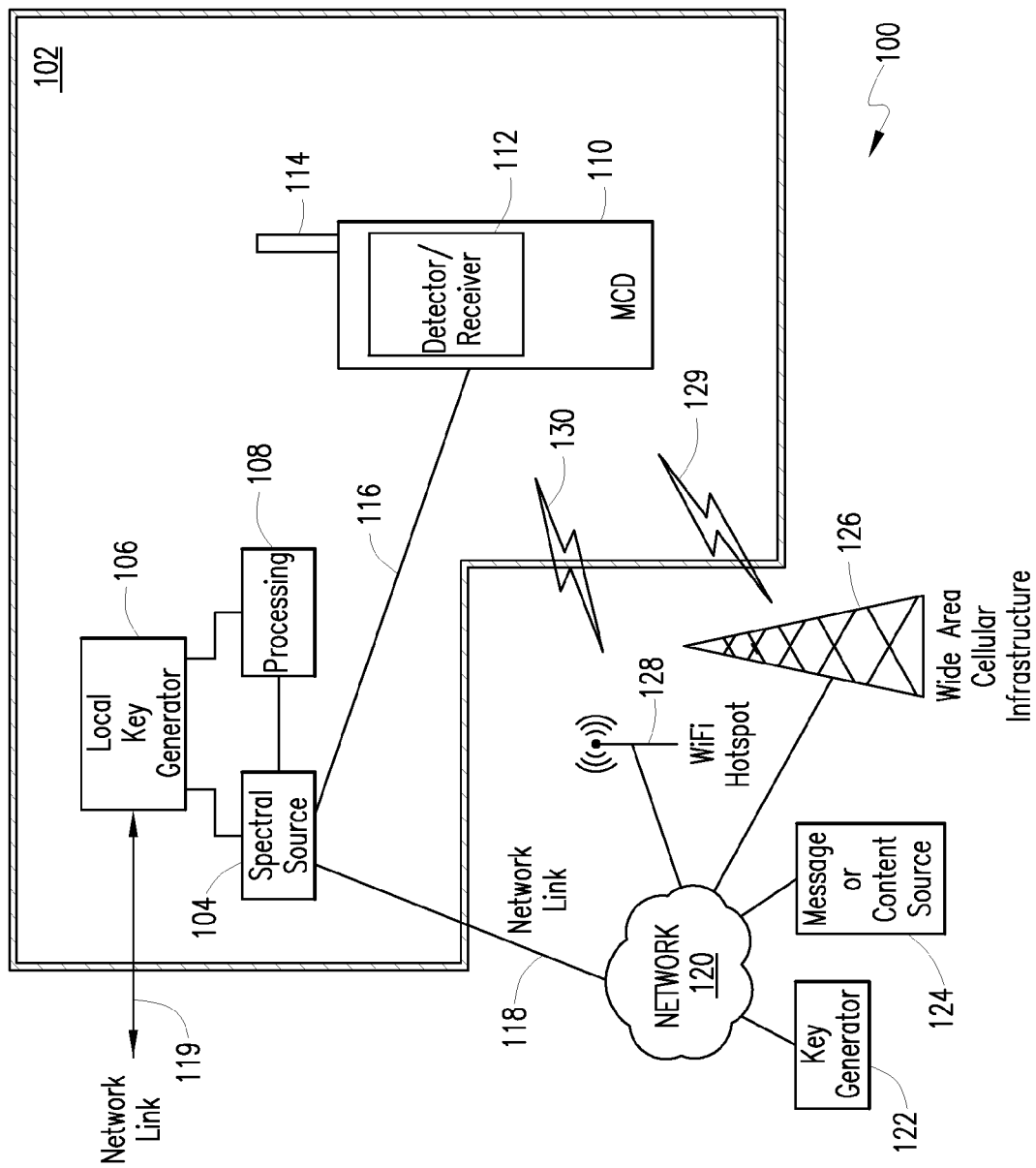
FIG. 1 depicts an example arrangement wherein information (e.g., authentication key or token information) may be transmitted to a communication device (e.g., a mobile device) via a link that is spectrally confined to an enclosure in accordance with an embodiment of the present patent application.

The present patent disclosure is broadly directed to providing secure authentication and key exchange for communication devices such as, e.g., mobile communication devices, using spectrally confined radiation transmission media.

In one aspect, an embodiment of a method for securely communicating authentication data (i.e., cryptographic keys, tokens, digital certificates, security ID information, and the like) to a communication device is disclosed. The embodiment includes modulating a spectral source's radiation using the authentication data, wherein the spectral source's radiation is adapted to operate as a first transmission medium for carrying the authentication data, the first transmission medium being containable within an enclosure that inhibits passage of the spectral source's radiation (i.e., spectrally opaque enclosure); and transmitting the modulated authentication data via the first transmission medium to the communication device disposed in the spectrally opaque enclosure.

In another aspect, an embodiment of a secure communication system for communicating authentication data is disclosed. The secure communication system embodiment comprises a spectral source for emitting radiation that is adapted to operate as a first transmission medium for carrying information. Additionally, the first transmission medium is containable within an enclosure that inhibits passage of the spectral source's radiation. Also included in the embodiment is a modulator for modulating the radiation using the authentication data to provide modulated authentication data carried on the first transmission medium. A communication device disposed within the enclosure is adapted for receiving the first transmission medium, wherein the communication device includes a demodulator for demodulating the authentication data from the first transmission medium.

In a further aspect, an embodiment of a mobile communication device is disclosed, which comprises a first communication subsystem configured to receive and transmit data on an optical wireless transmission medium; a second communication subsystem configured to receive and transmit data on a radio frequency transmission medium; and a processor configured to control the first and second communication subsystems in order to effectuate: receiving of authentication data via the optical wireless transmission medium; and receiving of encrypted information via and radio frequency transmission medium. Also included in the mobile communication device is a cryptographic module controlled by the processor for decrypting the encrypted information received on the RF transmission medium using the authentication data received on the optical wireless transmission medium.

In a still further aspect of the present patent application, an embodiment of a key distribution system is disclosed. A key generator is provided for generating authentication keys which may be transported via a transport network coupled between the key generator and a plurality of spectral source access points, wherein the plurality of spectral source access points are distributed in a number of enclosures that are spectrally opaque to radiation emitted by the spectral source access points. In one implementation, each of the plurality of spectral source access points includes a modulation block operable to modulate emitted radiation. In a further variation, only a subset of the spectral source access points may have corresponding local modulators. The key distribution system may be controlled by a processor block configured to determine that an authorized communication device has arrived in a particular enclosure, wherein the processor block is further configured to instruct the key generator to generate an authentication key (i.e., a first key) for transmission via the transport network to a spectral source access point disposed in the particular enclosure. The authentication key information is modulated on the radiation emitted by the spectral source access point disposed in the particular enclosure for transmitting said authentication key to the authorized communication device. The processor block may also be configured to instruct the key generator to generate a second authentication key for transmission to a spectral access point disposed in a different enclosure, wherein the first and second keys may comprise different strength levels.

Embodiments of systems, methods, apparatuses and associated tangible computer-readable media having instructions and tangible computer program products for securely communicating or exchanging authentication and/or other security key information using appropriate spectral radiation in accordance with the teachings of the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1, depicted therein is an example arrangement 100 where information (e.g., authentication key or token information) may be transmitted to or otherwise exchanged with a communication device (e.g., a mobile device) via a link that is spectrally confined to an enclosure in accordance with an embodiment of the present patent application. For purposes herein, a communication device 110 is illustrated as a mobile communication device (MCD) in FIG. 1, which may also be somewhat interchangeably referred to as a wireless user equipment (UE) device, wireless terminal, mobile terminal, mobile station, or a white-space device, et cetera. In a more general representation, the communication device 110 may also comprise any portable or desktop computer (e.g., laptops, palmtops, handheld computing devices, electronic readers or e-readers, or tablet computers) capable of wired/wireless communication or any enhanced personal digital assistant (PDA) device or integrated information appliance capable of email, video mail, Internet access, corporate data access, messaging, calendaring and scheduling, information management, and the like, that may be operable in one or more modes of operation. For example, the communication device 110 may operate as a wireless radio device in the conventional long-range and short-range radio frequency (RF) bands such as cellular telephony band frequencies and wireless Local Area Network (WLAN) bands, or possibly in the WLAN bands alone. Further, other bands in which the communication device 110 could operate wirelessly using the RF media may comprise Wi-MAX bands, one or more satellite bands, TV white space bands, etc. Accordingly, the communication device 110 may be provided with one or more suitable RF antenna arrangements 114 to effectuate appropriate radio communications using the RF media.

For purposes of securely exchanging authentication and other security key information with the communication device 110, radiation from a spectral source 104 is appropriately modulated whereby modulated information may be transmitted to the communication device 110 via a transmission medium that is containable within an enclosure 102 by virtue of the physical/spectral properties of the radiation. By way of illustrative example, radiation that occupies the infrared (IR) region (roughly 300 GHz (1 mm) to 400 THz (750 nm)), the visible region (roughly between 380 nm and 760 nm (790 THz to 400 THz) that is perceived by humans as light), or the ultraviolet (UV) region of the electromagnetic (EM) spectrum may be used for purposes of serving as a relatively short-range transmission medium that can be contained within an enclosure that is spectrally opaque. For purposes of the present disclosure, it should be appreciated that the term "opaque" depends on the enclosure material and how effectively a particular EM wavelength in question may be attenuated by it. Accordingly, a number of THz and GHz frequencies may be employed within the context of the embodiments set forth herein. Where the enclosure 102 may have windows, vents, ports or other exits/entries (not explicitly shown in FIG. 1), such features may be physically rendered spectrally opaque by means such as blinds, shutters, shades, curtains, etc. or by applying spectrally selective films that can inhibit transmission of select wavelengths emitted by the spectral source 104 used as transmission media for carrying the authentication and other security key data. Accordingly, the spectral source 104 may comprise solid-state devices such as light emitting diodes (LEDs), fluorescent lights, incandescent lights, or any other source that can emit radiation in the appropriate regions of the EM spectrum, including coherent light sources such as a laser source. For example, LED sources may comprise phosphorus LEDs, red-green-blue (RGB) or white LEDs, resonant cavity LEDs (RCLEDs), organic LEDs, infrared LEDs, quantum dot LEDs, and the like.

The spectral source's radiation may be modulated, processed and/or otherwise suitably manipulated by appropriate processing means 108 (including hardware circuitry, software instructions or code, or both) such that the emitted radiation is rendered to carry the authentication and security key data. As an illustration with respect to visible light, modulation may be used to transform the authentication and security key data (which may provided as digital information, e.g., sequence of 0's and 1's) into a series of light pulses (e.g., up to thousands or tens of thousands per second) whose flickering is imperceptible to the human eye. Example modulation schemes may include sub-carrier pulse position modulation (SC-PPM), on-off keying (OOK), and frequency shift keying (FSK), although any number of other known modulation schemes such as, e.g., Orthogonal Frequency Division Multiplexing (OFDM), or any heretofore unknown schemes may be used depending on the particular spectral link implementation. In one embodiment, it is the frequency of light pulses that is modulated using the authentication/key data and not the frequency of the light itself. For intensity modulation, data may be contained in the amplitude and frequency of the modulated pulses. For coherent modulation communications, the phase and amplitude of the underlying spectral/optical carrier can be modified. In multi-wavelength systems where modulation over different wavelengths is effectuated (e.g., a wavelength division multiplex or WDM systems), the frequency (i.e., "color") of the underlying carrier may also be modulated. In an SCPPM scheme, data may be separated into groups of log K bits each where there is a single pulse for each group. In FSK modulation, the signal frequency determines whether or not a currently transferred bit is a binary 0 or 1. Regardless of the modulation scheme or the particular spectral source used, the emitted radiation is rendered as a transmission medium (e.g., a first transmission medium) operable to carry appropriate authentication/key data on a spectrally confined communication link 116 within the enclosure 102 to the communication device 110 that is provided with suitable spectral-specific detector/receiver functionality 112. Those skilled in the art will appreciate that communications over the link 116 can be ensured to be secure because the spectral link 116 is physically confined to the enclosure 102 and only users with communication devices authorized to be in the enclosure 102 may be permitted access to the enclosure 102. Accordingly, a physical layer-based security scheme can be implemented for securely exchanging data with the communication devices using spectrally and spatially confined communication links. Moreover, because physical access to the enclosed spaces may be controlled and location of the communication devices within the enclosed spaces can be registered and monitored, location-based authentication and key data exchange sessions can be established wherein sensitive key information may be transferred to an authorized communication device only as long as it is within the spectrally-bounded enclosure. It should therefore be appreciated that such authentication and key data exchange transmissions are impervious to eavesdropping and man-in-the-middle attacks that can exist in an open RF network environment.

Authentication and security key data may be generated locally by a generator 106 that is co-located or otherwise associated with the spectral source 104, wherein the local generator 106 may be coupled to an external network infrastructure (e.g., a public packet-switched network such as the Internet, a circuit-switched (CS) wireline telephony network, a Public Land Mobile Network (PLMN)), a packet-switched (PS) network, an enterprise network such as an Intranet, and the like) via a suitable connection 119. In another implementation, authentication and security key data may be obtained from a network-based key generator 122 over a suitable network 120 coupled to the spectral source 104 via a network link 118. By way of example, network 120 may comprise a power-line infrastructure, the Internet, and/or any combination of the PLMN/PSTN infrastructure involving wired communications or wireless long-range and short-range RF communications.

In an exemplary scenario, the communication device 110 is operable to communicate in both RF media as well as suitable spectrally bounded radiation media as set forth hereinabove. For instance, the communication device 110 may securely engage in a key exchange session using link 116 effectuated by means of spectral radiation in an applicable wavelength or frequency range (i.e., via a first transmission medium) whereby it obtains a cryptography key that may be used for decrypting encrypted information. The communication device 110 may also engage in RF communications using long-range or wide area cellular infrastructure 126 and/or short-range WiFi network infrastructure 128 (which may be placed within the enclosure 102 in some implementations) coupled to the network 120 for receiving information (e.g., content, data, or messages) that is encrypted. Reference numerals 129 and 130 are representative of communication links effectuated by means of such RF media (i.e., second transmission media), which may be implemented in any radio access technology (RAT) using frequencies that are compatible with Global System for Mobile Communications (GSM) networks, Enhanced Data Rates for GSM Evolution (EDGE) networks, Integrated Digital Enhanced Networks (IDEN), Code Division Multiple Access (CDMA) networks, Universal Mobile Telecommunications System (UMTS) networks, any 2nd- 2.5- 3rd- or subsequent Generation networks, Long Term Evolution (LTE) networks (i.e., Enhanced UMTS Terrestrial Radio Access or E-UTRA networks), networks capable of High Speed Downlink Packet Access (HSDPA) or High Speed Uplink Packet Access (HSUPA), or wireless networks employing standards such as Institute of Electrical and Electronics Engineers (IEEE) standards, like IEEE 802.11a/b/g/n standards or other related standards such as HiperLan standard, HiperLan II standard, Wi-MAX standard, OpenAir standard, and Bluetooth standard, as well as any mobile satellite communications technology such as Geo Mobile Radio (GMR)-1, and other satellite-based technologies, e.g., GPS. Accordingly, the radio network environment 120 illustrated in FIG. 1 may be envisaged to include wide area cellular coverage regions as well as femto cells and pico cells (that extend coverage to indoor areas, for example, the spectrally opaque enclosure 102), and the like.

Because the cryptography key data may be obtained by the communication device 110 by means of the spectrally/spatially confined link 116, there is virtually no chance of it being unlawfully obtained by an unauthorized party. Accordingly, the encrypted communications with the communication device 110 over the secondary RF transmission media using any RAT can remain highly impervious to security attacks during transmission. In one variation, the authentication data (i.e., the cryptographic key information) may be dynamically generated, regenerated, created or otherwise updated periodically or randomly, and transmitted on the spectral link 116 to the communication device 110. For example, the cryptographic key information may be updated for every "t" seconds and may be transmitted to the communication device 110 as long as it is within the enclosure 102. In another variation, a new cryptography key may be generated for every predetermined block of data (e.g., for every N packets, bytes, etc.) transmitted on the RF medium. The authentication data may also be inactivated, whether dynamic or static, upon determining that the enclosure 102 is no longer spectrally opaque with respect to the spectral source's radiation. In a still further variation, additional determinations may be implemented for ascertaining that the communication device 110 is authorized to receive the cryptographic key information and for verifying that the communication device 110 is physically located in the enclosure 102. It should be recognized by one skilled in the art that the functionality necessary to effectuate such determinations may be implemented in hardware, software, firmware, or in any combination thereof, including suitable presence detection schemes, and may be co-located with the spectral source 104, local key generator 106 and processing 108, or may be resident on the communication device 110, or may be based in the network (e.g., network 120), or in a distributed arrangement.

Figure 2:
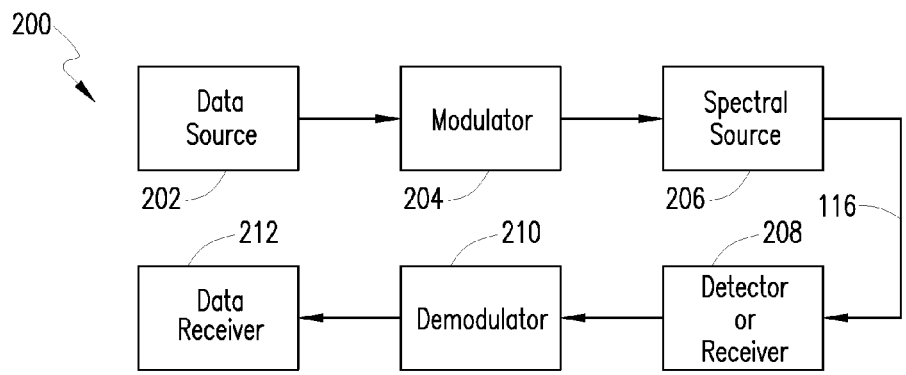
FIG. 2 depicts a block diagram of an example arrangement for effectuating information transfer via a spectrally confined link.

FIG. 2 depicts a block diagram of an example apparatus 200 for effectuating information transfer via a spectrally confined link such as link 116 described above. A data source 202 is an example representation of any source that generates data for transmission to a data receiver 212 (e.g., the communication device 110 in FIG. 1) using one or more spectral link implementation embodiments set forth in the present patent application. In one implementation, the data source 202 may be a source adapted to generate highly sensitive information such as cryptography key information, authentication information, security token information, digital certificate information, identity certificate information and the like. In another implementation, the data source 202 may be a source providing encrypted or plaintext information such as messages, data, digital audio/video content and the like. Irrespective of the type of information to be transmitted over a spectrally confined transmission link, a suitable modulator 204 is utilized in conjunction with a spectral source 206 to modulate the information over the emitted EM radiation carrier waves in free space. In one example configuration, the spectral source 206 may be provided as a source of radiation that has the properties of relatively small-angle scattering, short attenuation, or both, in order to help enhance spectral confinement even in smaller enclosures or in outdoor settings. A suitable detector/receiver 208 is operable to detect the propagated radiation which is demodulated via demodulation means 210 having appropriate hardware/software modules. As one skilled in the art will recognize, the detector/receiver 208 may be radiation-specific and implementation-specific, and may comprise components such as cameras, charge-coupled devices (CCDs) coupled to image sensors, discrete or integrated photodiodes or arrays, IR/UV sensors, etc. that may be provided as separate equipment or integrated with the data receiver equipment 212 such as the communication device 110 itself.

Figure 3:
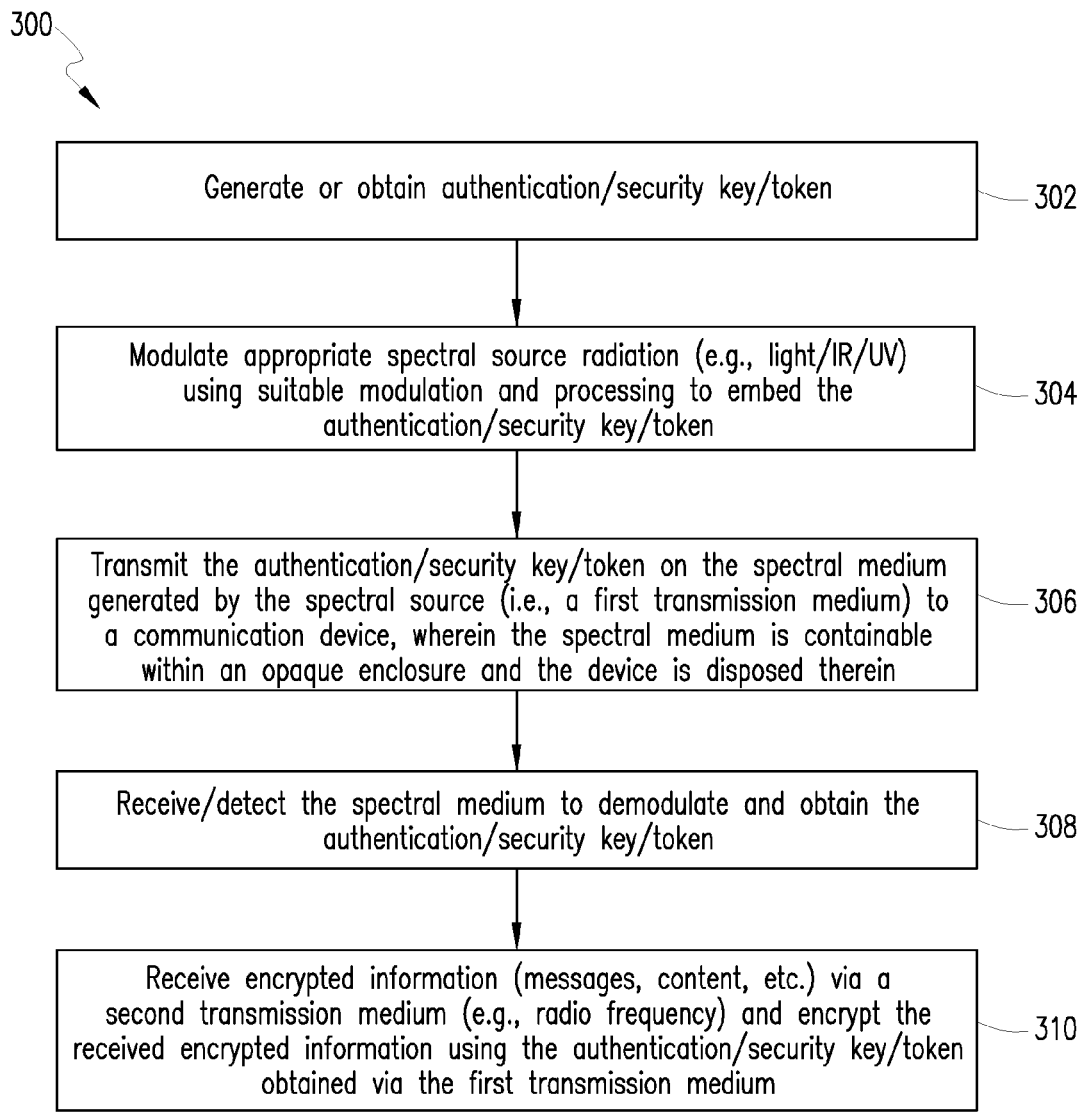
FIG. 3 depicts a flowchart of an example methodology for effectuating secure transfer of authentication and key information with a communication device (e.g., a mobile device) in accordance with an embodiment of the present patent application.

Taking reference to FIG. 3, depicted therein is a flowchart of an example scheme 300 for effectuating secure transfer of authentication and key information with a communication device (e.g., a mobile device) in accordance with an embodiment of the present patent application. At block 302, sensitive information such as authentication/security keys or token information is generated (i.e., a generated security token) or otherwise obtained for purposes of secure transmission over a spectrally confined communication link. Block 304 includes mechanisms for modulating radiation of a spectral source (e.g., visible light, IR, UV, or other THz and GHz frequencies, etc.) to embed the sensitive information, which is then transmitted in free space to a receiver as a modulated radiation medium (i.e., a first transmission medium) that is containable within a spectrally opaque enclosure (block 306). Upon receiving and suitably demodulating the radiation medium, the authentication/security key information is obtained (block 308). Such data may be locally stored for decrypting, shared with another receiver via a peer-to-peer connection that is also spectrally contained within the same opaque enclosure, or may be periodically updated, and the like. As an option, accordingly, the receiver may engage in a RF communication session via radio waves (i.e., a second transmission medium) to receive encrypted information that may be decrypted using the key information received via the first transmission medium.

As one skilled in the art will appreciate, because of the physical-layer security inherent in the communication scheme set forth above, any type of authentication/security key information may be safely transmitted without the risk of eavesdropping and man-in-the-middle attacks. Secure exchange of public keys, private keys, symmetric key ciphers, Rivest-Shamir-Adleman (RSA) tokens, Diffie-Hellman-Merkle shared keys, etc. is therefore possible with a degree of security that is generally not available in an open RF network environment. Additionally, not only may the cryptographic keys be dynamically changed in time, but also because of the localized nature of the emitted radiation media, the keys can be issued based on location, thereby permitting differentiated levels of security depending on the physical location of the user/subscriber associated with the communication device. Accordingly, a multi-factor authentication scheme (e.g., a three- (or higher) factor scheme) may be implemented based on location as one of the factors in addition to factors such as (i) what a requestor/user individually knows as a secret, such as a password or a unique personal indicium such as a Personal Identification Number (PIN); (ii) what the requesting owner uniquely has, such as a passport, hardware/software token, or an ID-card; and (iii) what the requesting bearer individually is, such as biometric data, like a fingerprint or the face geometry, for example. Furthermore, as alluded to previously, the keys may also be changed dynamically based on an external signal (e.g., information content transmitted via another transmission medium or on the same spectrally confined radiation carrying the key information) or possibly another input, e.g., user-selected input.

Figure 4:
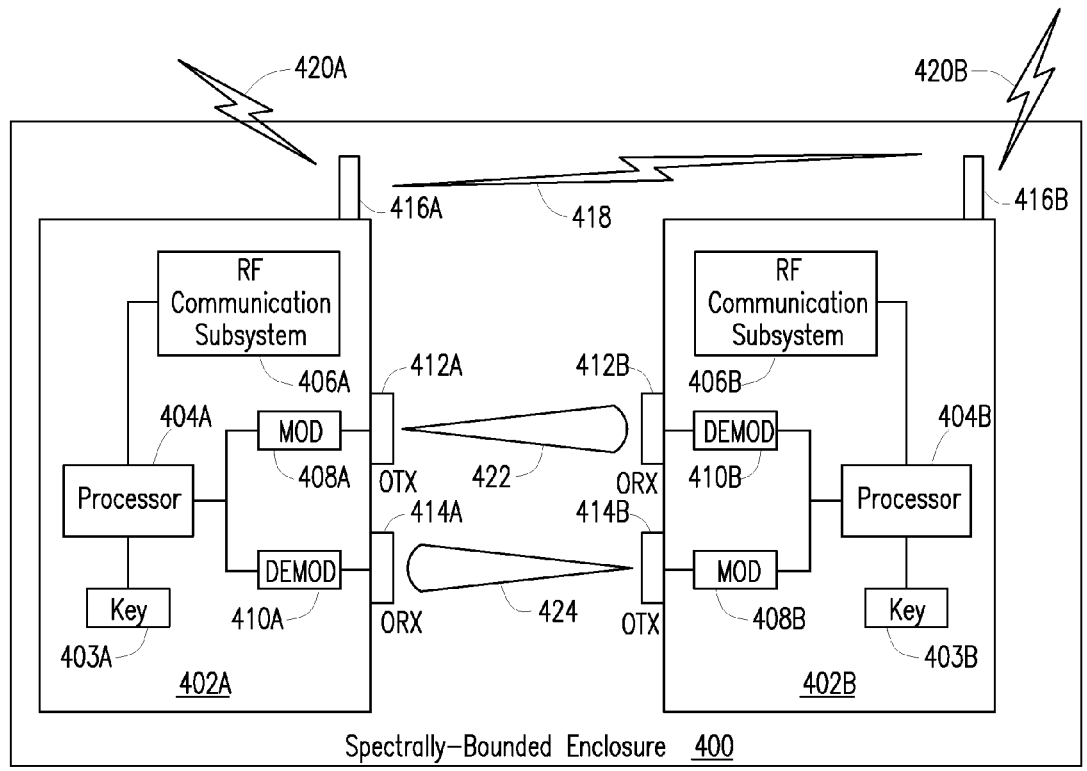
FIG. 4 depicts an example arrangement of two mobile data communication devices in a peer-to-peer relationship for effectuating secure communications therebetween in a spectrally bounded enclosure in accordance with an embodiment of the present patent application.

FIG. 4 depicts an example arrangement of two mobile communication devices 402A, 402B in a peer-to-peer relationship for effectuating secure communications therebetween in a spectrally-bounded enclosure 400 in accordance with an embodiment of the present patent application. As illustrated, each mobile communication device 402A, 402B is provided with an RF communication subsystem 406A, 406B, for effectuating RF communications using corresponding antenna components 416A, 416B. Reference numerals 420A and 420B accordingly refer to RF transmission links effectuated between mobile devices 402A and 402B and an open RF network (e.g., network 120 shown in FIG. 1). In addition, each mobile device also includes a suitable spectral/optical wireless communication subsystem comprising modulator/demodulator circuitry, spectral sources and detectors, signal processing, and the like, that is configured to operate under appropriate processor and program code control. Mobile device 402A is accordingly provided with processor 404A, modulator 408A and demodulator 410A, wherein a spectral source 412A is coupled to modulator 408A and a detector/receiver 414A is coupled to a demodulator 410A. In similar fashion, mobile device 402B is provided with processor 404B, modulator 408B and demodulator 410B, wherein a spectral source 412B is coupled to modulator 408B and a detector/receiver 414B is coupled to a demodulator 410B. Reference numerals 422 and 424 refer to spectrally confined links between the mobile devices 402A and 402B, which may be based on the same EM radiation wavelength or two different EM radiation wavelengths, for effectuating peer-to-peer communications therebetween in either uplink or downlink configurations depending on the direction of the communications. Accordingly, a mobile device, e.g., mobile device 402A, may receive a cryptography key from an external key generator via a non-peer spectrally confined link, which may be shared with the other mobile device (e.g., mobile device 402B) using the peer-to-peer link 422. Optionally, either or both mobile devices 402A, 402B may also include a local key generator 403A, 403B for generating and securely exchanging keys using the peer-to-peer links 422, 424. In addition, a peer-to-peer RF wireless communication link (e.g., Bluetooth link) 418 may also be effectuated between the mobile devices 402A and 402B for localized RF communications therebetween.

Figure 5:
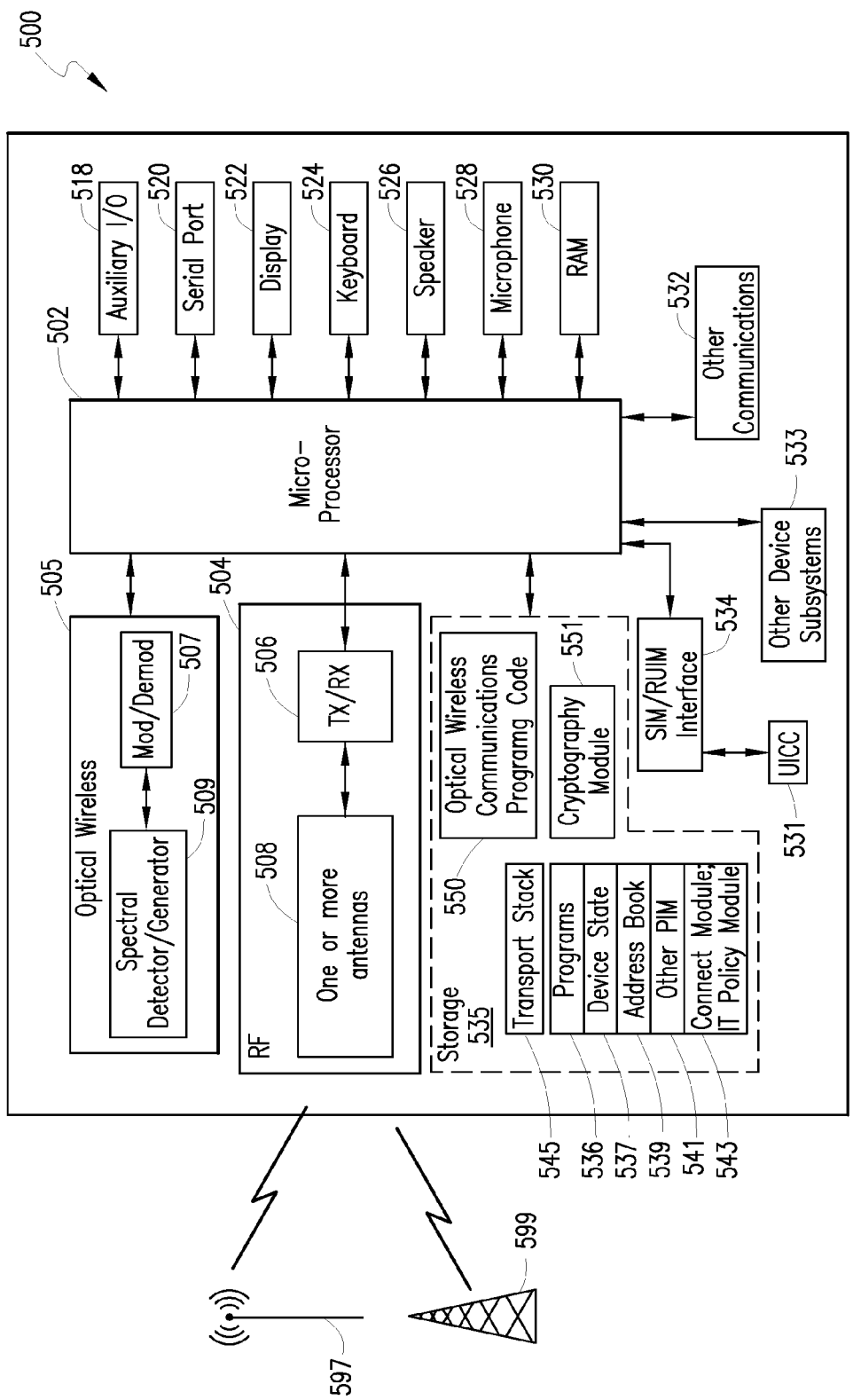
FIG. 5 depicts a block diagram of an example mobile communication device according to one embodiment of the present patent application.

FIG. 5 depicts a block diagram of an example mobile communication device or a wireless UE device 500 that is representative of either mobile devices 402A and 402B according to one embodiment of the present patent application wherein additional details are more particularly shown. Mobile communication device 500 may be provided with an RF communication subsystem 504 that includes an antenna assembly 508 (with one or more antennas), suitable RF transceiver circuits 506 operable with one or more RATs, as well as additional hardware/software components such as, e.g., signal processors and the like. Likewise, a spectral/optical wireless communication subsystem 505 includes suitable detector/generator assembly 509 and modulation/demodulation components 507. One or more microprocessors 502 providing for the overall control of the device 500 is operably coupled to the two communication subsystems 504 and 505. As to the conventional RF communication subsystem 504, it should be appreciated that such a subsystem may be configured to operate with various access technologies, operating bands/frequencies and networks (for example, to effectuate multi-mode communications in voice, data, media, or any combination thereof in CS and/or PS domains). Accordingly, the particular design of the communication subsystem/module 504 may be dependent upon the communications network(s) with which the device is intended to operate, e.g., as exemplified by infrastructure elements 599 and 597.

Microprocessor 502 also interfaces with additional device subsystems such as auxiliary input/output (I/O) 518, serial port 520, display 522, keyboard 524, speaker 526, microphone 528, random access memory (RAM) 530, other communications facilities 532, which may include for example a short-range communications subsystem, and any other device subsystems generally labeled as reference numeral 533. Example additional device subsystems may include accelerometers, motion sensors, location sensors, IR/UV sensors, ambient temperature sensors, cameras, photo detectors, dedicated illumination sources, and the like. To support access as well as authentication and key generation, a SIM/USIM interface 534 (also generalized as a Removable User Identity Module (RUIM) interface) is also provided in communication with the microprocessor 502 and a Universal Integrated Circuit Card (UICC) 531 having suitable SIM/USIM applications.

Operating system software and other system software may be embodied in a persistent storage module 535 (i.e., non-volatile storage subsystem) which may be implemented using Flash memory or another appropriate memory. In one implementation, persistent storage module 535 may be segregated into different areas, e.g., transport stack 545, storage area for computer programs 536, as well as data storage regions such as device state 537, address book 539, other personal information manager (PIM) data 541, and a connect module manager including an IT policy module as well as other data storage areas generally labeled as reference numeral 543. Additionally, the persistent memory may include appropriate software/firmware 550 necessary to effectuate suitable program code control and processing with respect to spectrally confined communications (e.g., optical wireless) in conjunction with the microprocessor 502 and the communication subsystem 505. Powered components may receive power from any power source (not shown in FIG. 5). The power source may be, for example, a battery, but the power source may also include a connection to power source external to wireless UE device 500, such as a charger. Additionally, suitable cryptography/authentication programs/code 551 may be provided as part of the persistent storage 535 for effectuating key generation, authentication protocols, and the like under the control of microprocessor 502 and other related subsystems.

Figure 6:
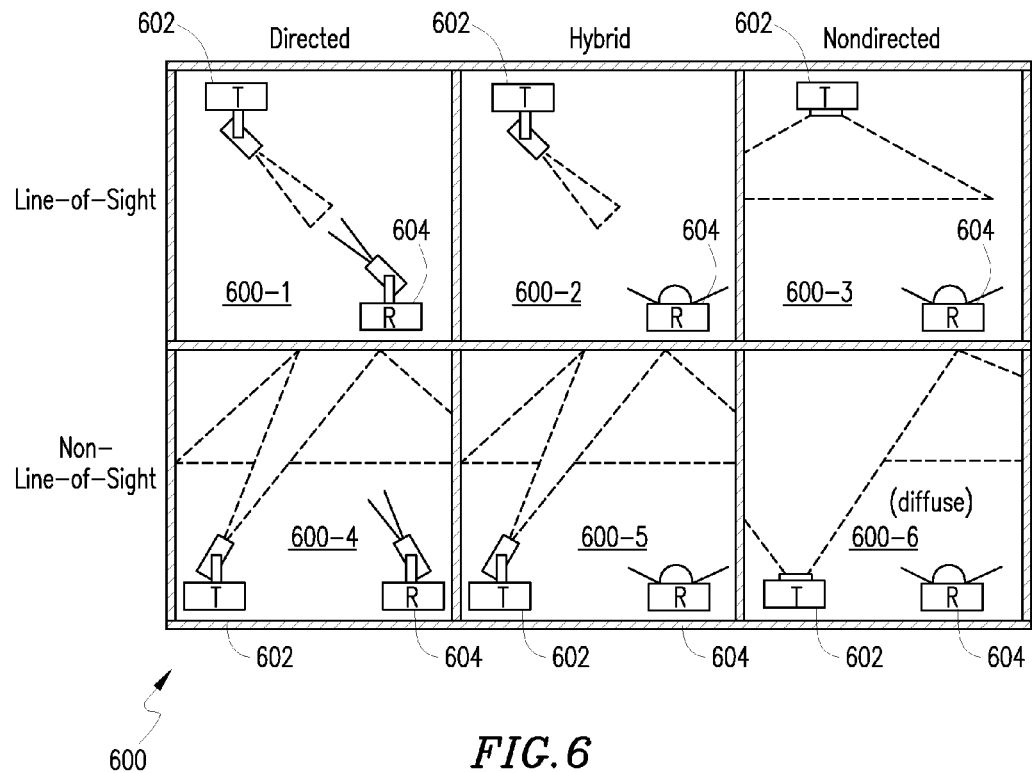
FIG. 6 depicts a plurality of arrangements for spectral/optical links according to the degree of directionality of the transmitter (source) and receiver (e.g., coupled to a communication device)

FIG. 6 depicts a plurality of arrangements for spectral links between a transmitter (source) and receiver (e.g., coupled to a communication device) that may be effectuated within a spectrally opaque enclosure for purposes of the present patent application. Two configuration criteria relative to the transmitters and receivers may be typically employed. One is the degree of directionality of the transmitter and receiver. A directed link configuration employs directional transmitters and receivers, which must be aimed in order to establish a link. On the other hand, nondirected links employ wide-angle transmitters and receivers, thereby alleviating the need for such pointing. Directed link design maximizes power efficiency, since it minimizes path loss and reception of ambient light noise. However, nondirected links may be more convenient to use, particularly for mobile communication devices, since they do not require aiming of the transmitter or receiver. It is also possible to establish hybrid links, which combine transmitters and receivers having different degrees of directionality. The second configuration criterion relates to whether the spectral transmission link relies upon the existence of an uninterrupted line-of-sight (LOS) path between the transmitter and receiver. LOS links rely upon such a path, while non-LOS links generally rely upon reflection of the radiation (light, IR or UV) from the ceiling or some other diffusely reflecting surface of an enclosure. Whereas LOS link design aims to maximize power efficiency and minimize multipath distortion, non-LOS link design generally increases link robustness and ease of use, allowing the link to operate even where barriers, such as furniture, people or cubicle partitions, stand between the transmitter and receiver. In general, maximum robustness and ease of use may be achieved by the nondirected-non-LOS link design, which is often referred to as a diffuse link.

In accordance with the foregoing classificatory criteria, a directed LOS link configuration in enclosure 600-1 employs a transmitter 602 configured to emit directed radiation to a receiver 604 having a cone of reception with a fairly narrow angle. With the same LOS condition, a hybrid configuration in enclosure 600-2 may be implemented with the directed transmitter 602 in conjunction with the receiver 604 having a different degree of directionality (usually a much wider angle of reception). In configuration 600-3, both the transmitter 602 and receiver 604 have non-directed radiation characteristics but rely on a LOS path. With respect to non-LOS configurations, enclosure 600-4 employs a directed transmitter 602 that directs radiation to a surface that is reflected to and received by a directed receiver 604. Enclosure 600-5 illustrates a directed transmitter 602 while the transmitter 604 has a wider degree of directionality. Enclosure 600-6 exemplifies a diffuse link configuration where both the transmitter 602 and receiver 604 have wide angles of directionality.

Figure 7:
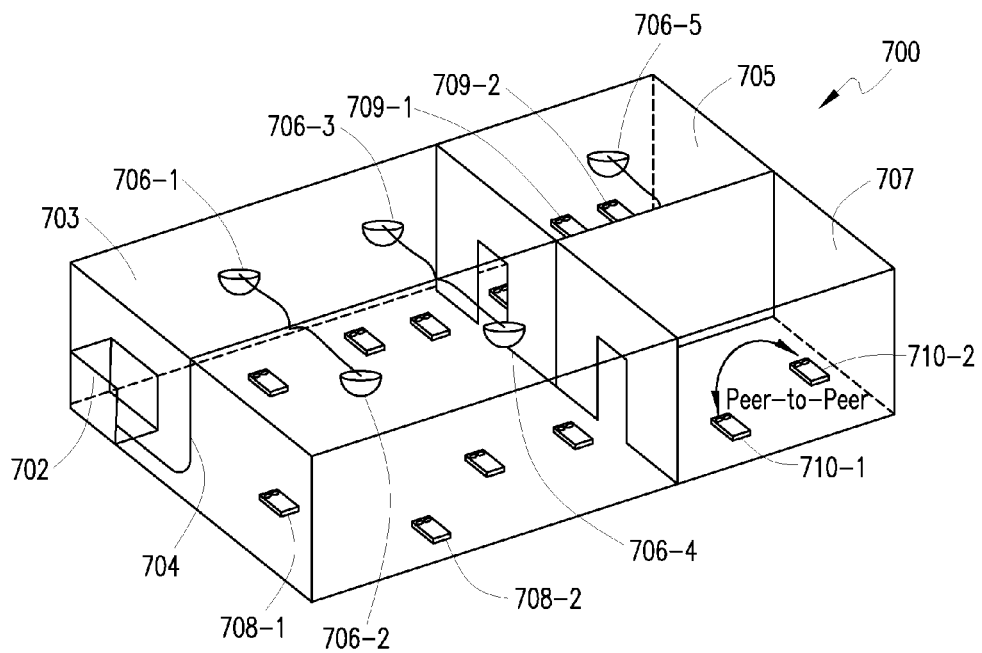
FIG. 7 illustrates an example arrangement with a plurality of enclosures wherein a centralized key distribution system may be implemented according to an aspect of the present disclosure.

Referring to FIG. 7, illustrated therein is an example arrangement with a plurality of enclosures wherein a centralized key distribution system 700 may be implemented according to an aspect of the present disclosure. An information server 702 including a key generator and suitable program code processing functionality is configured to serve a building (e.g., an office) having a first opaque enclosure 703 and a second opaque enclosure 705, each having one or more spectral access points 706-1 to 706-5. Each spectral access point may be envisioned as a spectral source configured to emit radiation that can be modulated based on the key information provided by the server 702 via a transport network 704. A plurality of communication devices, e.g., devices 708-1, 708-2, disposed in enclosure 703 are operable to establish spectrally confined links with spectral access points 706-1 to 706-4 using any of the link configurations set forth above, whereby authentication/security keys of a certain strength level may be distributed to the devices 708-1, 708-2, for example, upon determining that such devices are authorized to be in the enclosure 703. Likewise, another set of communication devices 709-1, 709-2, disposed in enclosure 705, may be establish spectrally confined links with the spectral access point 706-5 whereby authentication/security keys of another strength level may be distributed to the devices 709-1, 709-2, again, for example, upon determining that such devices are authorized to be in the enclosure 705. Additionally, peer-to-peer devices 710-1, 710-2 may be placed in another spectrally bounded enclosure 707 such that one of the devices may locally generate keys to be exchanged with the other peer device(s) also disposed therein.

Based on the foregoing description, a number of specific implementation scenarios may be provided in accordance with the teachings of the present patent application as set forth immediately below. Those skilled in the art will readily recognize, however, that these scenarios are strictly illustrative and the teachings of the present patent application may be applied in other situations as well.

In a first implementation scenario, key agreement in an office setting may be described as follows. An optical wireless network can be established in the office (similar to an arrangement shown in FIG. 7 above, for instance) by way of dedicated optical emitters or even using overhead lighting fixtures suitably configured to be modulated with key information data. As an example, visible light communication (VLC) is a technology that may be implemented for modulating illumination fixtures with LED or fluorescent devices to send data. It should be noted that emissions from such light sources are confined to a room via opaque boundaries. In the case of locations with windows, it is possible to confine emissions to the room by drawing blinds or by applying a film to the window itself that is designed to filter the wavelengths used for communication. Mobile communication devices may be adapted to operate with an optical wireless receiver (e.g., a dedicated device or existing camera or ambient light sensor) to establish a connection with the light source (e.g., overhead lights) to authenticate and acquire key information. Authentication and confidentiality of the transmission are assured due to the confinement of optical emissions to the room. In other words, only users who are allowed to enter the room are able to receive the keys. As described hereinabove, illumination devices mounted on the ceiling or other surfaces of the enclosure transmit security information via radiation media confined to a given location. Further, multiple security levels may be established in the example office environment at any given time. Security levels can also be changed dynamically in time or depending on information content or due to some other external signal.

Security information can be updated periodically in time to devices via the overhead network (e.g., transport network 704 shown in FIG. 7). For example, keys can be set to expire after a period of time. Since security protocols of different strength can be employed depending on the location, the user may be granted permission to view strictly confidential material when in the office at one location and when departing that location of the office, access to such material may be denied. Accordingly, in one embodiment of the present patent application, differentiated security levels depending on location, information, time, or other selectable parameters may be implemented. In a concrete example involving cryptography, an optical wireless (OW) indoor downlink channel may be implemented to provide perfect forward secrecy with ephemeral Diffie-Hellman (DH) key exchange system by preventing a man-in-the-middle attack. DH key exchange allows for the communication of a secret key to two parties without prior knowledge. A challenge in the DH key exchange scheme is that authentication is required to avoid a man-in-the-middle attack. Currently, password-protected DH (e.g., Single Password Exponential Key Exchange or SPEKE) is employed where a common password is shared a priori between a server and the device which is difficult to change in a secure manner once a device is deployed. An embodiment of the present patent application can be advantageously implemented by using an indoor VLC communication channel in a room (e.g., an opaque enclosure in FIG. 7) to communicate the public keys for a given session or to change the root key periodically (perhaps weekly or monthly or depending on information content). As described previously, data communications can then proceed via suitable RF media wherein the communicated keys may be used for encryption/decryption. In this setting, authentication of the key is done "automatically" due to the localized nature of optical wireless transmission links, which may then be used to secure the broadcast RF transmissions. As a result, since the emissions of a VLC system can be locally contained, man-in-the-middle attacks are not possible and the DH key agreement effectuated thereby provides perfect forward secrecy. Accordingly, this aspect of the present patent application facilitates secure dynamic re-keying depending on time, location and information using optical wireless channels.

Additionally, since optical emissions are confined to a location, a bi-directional OW link can be established to communicate a private unique anonymous key wirelessly in a room or an enclosed space. For example, as illustrated in FIG. 4, two devices could initially exchange a private secret in a provably secure manner using optical wireless communications in an opaque enclosure or where the light-path is enclosed. In this case, both uplink and downlink for key exchange are in optical domain. Data communications can continue in optical domain or can also be in RF domain once initial keys are exchanged. As described hereinabove, the optical uplink can be accomplished using a variety of optical emitters including existing LED illumination devices on the conventional mobile devices (i.e., backlight LEDs, signal LEDs and LED flash). In this manner, it is possible to be assured that no one is able to eavesdrop on the wireless transfer of a common secret.

In a further scenario, secure communications may be implemented in an outdoor setting as well. For example, in an outdoor location a free-space optical link could be used to illuminate a small area of a couple of meters in diameter (i.e., a fairly narrow field of view) for authentication and key exchange. Since the path loss of outdoor optical wireless channels can be large and the optical beam can be rendered highly directive, it is generally difficult for an eavesdropper to intercept. At short wavelengths in the UV-C range (less than 250 nm), detectors are termed "solar blind" since very little spectral content from the sun exists at ground level. In this range, non-directive scattering communication channels can be established which require no pointing or alignment.

Such a UV optical wireless channel can be used for key agreement in a secure fashion since the UV radiation is highly attenuated outside several tens of meters. As before, once key agreement has taken place, secure radio communications can be applied using conventional encryption techniques.

Various processes, structures, components and functions set forth above in detail, associated with one or more network nodes, other infrastructure elements, mobile devices, or both may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on non-transitory computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A method for securely communicating information to a communication device, said method comprising:
    modulating a spectral source's radiation with authentication data using at least a sub-carrier pulse position modulation (SC-PPM);
    transmitting said modulated authentication data via a first transmission medium using a non-line-of-sight link to said communication device disposed in an enclosure that is spectrally opaque with respect to said spectral source's radiation, wherein the first transmission medium is contained within the enclosure by spectrally selective films, and said authentication data is used by said communication device to decrypt encrypted information transmitted over a second, different transmission medium; and
    when said enclosure is no longer spectrally opaque with respect to said spectral source's radiation, inactivating transmission of said modulated authentication data.

2. The method of claim 1 wherein said spectral source's radiation comprises at least one of an infrared (IR) radiation, a visible light radiation, or an ultra violet (UV) radiation.

3. The method of claim 1 wherein said spectral source's radiation is emitted by one of a light emitting diode (LED) source, a fluorescent light source, an incandescent light source, a UV source, or a laser source.

4. The method of claim 1 wherein said authentication data is dynamically generated and transmitted upon modulation to said communication device via said first transmission medium for every block of said encrypted information transmitted via said second transmission medium.

5. The method of claim 1 wherein said second transmission medium comprises a radio frequency associated with a radio access technology selected from IEEE 802.11a technology, IEEE 802.11b technology, IEEE 802.11g technology, IEEE 802.11n technology, GSM/EDGE Radio Access Network (GERAN) technology, Universal Mobile Telecommunications System (UMTS) technology, Evolution Data Optimized (EVDO) technology, Code Division Multiple Access (CDMA) technology, Time Division Multiple Access (TDMA) technology, Long-Term Evolution (LTE) technology, HiperLan technology, HiperLan II technology, Wi-MAX technology, OpenAir technology, Bluetooth technology, and GMR-1 technology.

6. The method of claim 1 wherein said modulated authentication data comprises at least one of a cryptographic key, a generated security token, a shared secret, an asymmetric key, or a personalized indicium associated with said communication device.

7. The method of claim 1 wherein said communication device comprises one of a mobile data communication device, a desktop computer, a laptop computer, a smartphone, a personal digital assistant, a tablet device, an electronic reader, or a digital audio/video player.

8. The method of claim 1 wherein said authentication data is obtained from a network node.

9. The method of claim 1 wherein said authentication data is generated by a generator co-located with said spectral source.

10. The method of claim 1 wherein said authentication data is dynamically generated and transmitted upon modulation to said communication device via said first transmission medium periodically.

11. The method of claim 1 wherein said modulated authentication data is transmitted to said communication device upon ascertaining that said communication device is authorized to receive said authentication data and verifying that said communication device is physically located in said enclosure.

12. The method of claim 1 further comprising inactivating transmission of said modulated authentication data upon determining that said communication device is no longer disposed in said enclosure.

13. A secure communication system for communicating information to a communication device, said secure communication system comprising:
    a spectral source for emitting radiation;
    a modulator for modulating said radiation with authentication data using at least a sub-carrier pulse position modulation (SC-PPM);
    a transmitter for transmitting said modulated authentication data via a first transmission medium using a non-line-of-sight link to said communication device disposed in an enclosure that is spectrally opaque with respect to said spectral source's radiation, wherein the first transmission medium is contained within the enclosure by spectrally selective films, said authentication data is used by said communication device to decrypt encrypted information transmitted over a second, different, transmission medium, and the transmitter is configured to inactivate transmission of said modulated authentication data when said enclosure is no longer spectrally opaque with respect to said spectral source's radiation.

14. The secure communication system of claim 13 wherein said spectral source comprises a source that generates at least one of an infrared (IR) radiation, a visible light radiation, or an ultra violet (UV) radiation.

15. The secure communication system of claim 13 wherein said spectral source comprises one of a light emitting diode (LED) source, a fluorescent light source, an incandescent light source, a UV source, or a laser source.

16. The secure communication system of claim 13 wherein said second transmission medium comprises a radio frequency associated with a radio access technology selected from IEEE 802.11g technology, IEEE 802.11b technology, IEEE 802.11g technology, IEEE 802.11n technology, GSM/EDGE Radio Access Network (GERAN) technology, Universal Mobile Telecommunications System (UMTS) technology, Evolution-Data Optimized (EVDO) technology, Code Division Multiple Access (CDMA) technology, Time Division Multiple Access (TOMA) technology, Long-Term Evolution (LTE) technology, HiperLan technology, HiperLan II technology, Wi-MAX technology, OpenAir technology, Bluetooth technology, and GMR-1 technology.

17. The secure communication system of claim 13 wherein said authentication data is dynamically generated and transmitted upon modulation to said communication device via said first transmission medium for every block of said encrypted information transmitted via said second transmission medium.

18. The secure communication system of claim 13 wherein said modulated authentication data comprises at least one of a cryptographic key, a generated security token, a shared secret, an asymmetric key, or a personalized indicium associated with said communication device.

19. The secure communication system of claim 13 wherein said communication device comprises one of a mobile data communication device, a desktop computer, a laptop computer, a smart phone, a personal digital assistant, a tablet device, an electronic reader, or a digital audio/video player.

20. The secure communication system of claim 13 further comprising a generator configured to generate said authentication data.

21. The secure communication system of claim 20 wherein said generator is co-located with said spectral source.

22. The secure communication system of claim 13 wherein said authentication data is dynamically generated and transmitted upon modulation to said communication device via said first transmission medium periodically.

23. The secure communication system of claim 13 wherein said modulated authentication data is transmitted to said communication device upon ascertaining that said communication device is authorized to receive said authentication data and verifying that said communication device is physically located in said enclosure.

24. A mobile communication device comprising:
a first communication subsystem configured to receive and transmit authentication data on an optical wireless transmission medium using a non-line-of-sight link, wherein said optical wireless transmission medium is contained within an enclosure by spectrally selective films;
a second communication subsystem configured to receive and transmit information on a radio frequency transmission medium, wherein said second communication subsystem is disposed in the enclosure; and
a processor configured to control said first and second communication subsystems in order to effectuate:
receiving of said authentication data via said optical wireless transmission medium using a non-line-of-sight link, wherein the authentication data is transmitted using at least a sub-carrier pulse position modulation (SC-PPM), and transmission of said authentication data is inactivated when an enclosure for a source of said authentication data is no longer spectrally opaque with respect to radiation from the source; and
receiving of encrypted information via said radio frequency transmission medium; and
a cryptographic module controlled by said processor for decrypting said encrypted information using said authentication data.

25. A key distribution system comprising:
a key generator for generating authentication keys;
a transport network coupled between said key generator and a plurality of spectral source access points, wherein said plurality of spectral source access points are distributed in a number of enclosures that are spectrally opaque to radiation emitted by said spectral source access points and further wherein each of said plurality of spectral source access points includes a modulation block configured to modulate emitted radiation using at least a sub-carrier pulse position modulation (SC-PPM), wherein the enclosures include spectrally selective films that inhibit passage of said radiation; and
a processor block configured to determine that an authorized communication device has arrived in a particular enclosure, wherein said processor block is further configured to instruct said key generator to generate an authentication key for transmission via said transport network to a spectral source access point disposed in said particular enclosure and further wherein said authentication key is modulated on the radiation emitted by said spectral source access point disposed in said particular enclosure for transmitting said authentication key to said authorized communication device using a non-line of-sight link, and transmission of said authentication data is inactivated when said particular enclosure is no longer spectrally opaque with respect to the radiation from said spectral source access point.

26. A secure communication method operating at a mobile communication device, said method comprising:
receiving authentication data via an optical wireless transmission medium using a non-line-of-sight link, wherein said authentication data is modulated over said optical wireless transmission medium generated by a source that is spectrally enclosed within an enclosure containing said mobile communication device using at least a sub-carrier pulse position modulation (SC-PPM), wherein the enclosure includes spectrally selective films, and transmission of said authentication data is inactivated when said enclosure is no longer spectrally opaque with respect to radiation from said source;
receiving encrypted information via a radio frequency transmission medium;
decrypting said encrypted information using said authentication data received via said optical wireless transmission medium.

* * * * *

UNITED STATES PATENT AND TRADEMARK OFFICE
CERTIFICATE OF CORRECTION

PATENT NO. : 9,544,766 B2
APPLICATION NO. : 14/114802
DATED : January 10, 2017
INVENTOR(S) : Steve Hranilovic and Christopher Labrador Page 1 of 1

It is certified that error appears in the above-identified patent and that said Letters Patent is hereby corrected as shown below:

In the Claims

Column 15, Line 10, In Claim 16, delete "802.11g" and insert -- 802.11a --, therefor.

Column 15, Line 16, In Claim 16, delete "(TOMA)" and insert -- (TDMA) --, therefor.

Column 16, Line 41, In Claim 25, delete "non-line of-sight" and insert -- non-line-of-sight --, therefor.

Signed and Sealed this
Tenth Day of April, 2018

Andrei Iancu
*Director of the United States Patent and Trademark Office*